United States Patent
Chiang

(10) Patent No.: US 7,258,478 B2
(45) Date of Patent: Aug. 21, 2007

(54) BACKLIGHT MODULE

(75) Inventor: Chih-Hung Chiang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 148 days.

(21) Appl. No.: 11/159,888

(22) Filed: Jun. 23, 2005

(65) Prior Publication Data

US 2006/0171171 A1 Aug. 3, 2006

(30) Foreign Application Priority Data

Feb. 3, 2005 (TW) .............................. 94103362 A

(51) Int. Cl.
 *F21V 7/04* (2006.01)
(52) U.S. Cl. ........................................ 362/633; 349/58
(58) Field of Classification Search ........ 362/632–634, 362/600, 602, 610, 615, 561; 349/58, 60, 349/65, 67, 70
See application file for complete search history.

(56) References Cited

U.S. PATENT DOCUMENTS 5,835,139 A * 11/1998 Yun et al. ...................... 349/58
6,064,565 A * 5/2000 Ishihara et al. ............. 361/681
6,330,148 B1 * 12/2001 Won et al. .................. 361/681
6,421,231 B1 * 7/2002 Jung ........................... 361/681
6,456,343 B2 * 9/2002 Kim et al. ..................... 349/58
7,113,237 B2 * 9/2006 Nitto et al. .................... 349/58
2002/0008804 A1 * 1/2002 Ogawa et al. ................. 349/58
2006/0033858 A1 * 2/2006 Liao et al. ..................... 349/58

* cited by examiner

*Primary Examiner*—Jong-Suk (James) Lee
*Assistant Examiner*—Jacob Y Choi
(74) *Attorney, Agent, or Firm*—Thomas, Kayden, Horstemeyer & Risley

(57) ABSTRACT

Backlight module. The backlight module comprises a frame, a light guide plate, and a positioning unit. The light guide plate is disposed in the frame. The positioning unit comprises a first positioning portion, disposed on the frame, a second positioning portion corresponding to the first positioning portion and disposed on the light guide plate, and a fixing element, passing through the first positioning portion and the second positioning portion such that the light guide plate is positioned in the frame.

9 Claims, 6 Drawing Sheets

BACKLIGHT MODULE

BACKGROUND

The invention relates to a backlight module, and in particular to a backlight module comprising a positioning structure for a light guide plate therein.

Currently, TFT-LCDs (thin film transistor-liquid crystal display) are increasingly applied in various electronic devices, such as personal digital assistants (PDAs), notebooks, computers, and TVs. The liquid crystal panel modules require a backlight module as a main light source. The backlight module is disposed behind the liquid crystal panel. Larger screens require light guide plates of the backlight module to be larger. The engagement method of the light guide plate thus has become an important factor in assembly of the backlight module.

FIG. 1A is a partial side view of a conventional backlight module 10, comprising a frame 11, a light guide plate 12, at least one light source 13, a plurality of optical films 14, and a reflecting sheet 15. The light guide plate 12, the light source 13, and the optical films 14, such as light diffusion sheet 141, and prism sheets 142, are supported and covered by the frame 11. The light source 13 is surrounded by the reflector 131 such that light emitted from the light source 13 is concentrated toward the light guide plate 12. The light guide plate 12 is disposed between the optical films 14 and the reflecting sheet 15. The light guide plate 12 directs the light emitted from the light source 13, located at a side of the light guide plate 12 forward, as indicated by the arrow, such that the light is uniformly transmitted, and subsequently distributed by the optical films 14 to produce a required color. FIG. 1A eliminates the panel, upper, and lower covers to clearly show the internal structure of the backlight module 10.

FIG. 1B is a top view of a conventional backlight module 10A with a positioning structure for light guide plate 12a, with other elements eliminated. 14a is the optical film located above the light guide plate 12a.

The light guide plate 12a of the conventional backlight module 10A is positioned by glue 16, fixing an edge 120 thereof on a side of the frame 11a by glue. The positioning method, however, has the following disadvantages. Since the light guide plate 12a is glued to the frame 11a, it is difficult to reassemble. If the glued portion is uneven, the light guide plate 12a can easily dislodge from the frame 11a. Additionally, when the backlight module 10A is inspected by reliability assurance (RA) or thermal shock test (TST), temperature changes can generate thermal expansion and contraction. Since glued edge 120 of the light guide plate 12a is fixed and unable to expand or contract accordingly, the light guide plate 12a may be displaced, causing unevenness. Thus, the backlight module 10A may have difficulty passing reliability assurance (RA) or thermal shock testing (TST).

FIG. 1C is a schematic view of another conventional backlight module 10B with a positioning structure for a light guide plate 12b. 14b is optical film disposed above the light guide plate 12b.

As shown in FIG. 1C, the light guide plate 12b of the conventional backlight module 10B comprises two symmetrical protruding portions 121, 122. The light guide plate 12b is positioned by engaging the protruding portions 121, 122 with the frame 11b. A disadvantage is that the frame 11b must be shaped corresponding to the protruding portions 121, 122, and thickness $W_1$ and $W_2$ of two sides of the frame 11b reduced. Structural strength is significantly affected. Additionally, the protruding portions 121, 122 fix the light guide plate 12b only along X and Y axes, but not along Z axis. Thus, if the liquid crystal display is moved in the direction Z, the light guide plate 12b can easily be displaced. Moreover, the additional shape of the protruding portions 121, 122 enlarges the size of the light guide plate 12b, thereby increasing total weight.

FIG. 1D is a schematic view of a conventional backlight module 10C with a positioning structure for a light guide plate 12c. 14c is disposed above the light guide plate 12c.

As shown in FIG. 1D, the light guide plate 12c of the conventional backlight module 10C comprises protrusions 123 and 124, inserted in a groove (not shown) of the frame 11c. Thus, the light guide plate 12c is securely positioned and inserted in the frame 11c. Manufacture of the groove and protrusions is, however, costly and complicated, and consequently, the detachment of the light guide plate is time-consuming. Moreover, the protrusions 123 and 124 extend along the Y axis. Thus, the light guide plate 12c cannot be fixed in direction Y. When rotating the liquid crystal display, insufficient structural support often produces unpleasant noises.

SUMMARY

Embodiments of the invention provide a backlight module applicable in a liquid crystal display to eliminate the shortcomings described.

Further provided is a backlight module comprising a frame, a light guide plate, and a positioning unit. The light guide plate is disposed in the frame. The positioning unit comprises a first positioning portion, disposed on the frame, a second positioning portion corresponding to the first positioning portion and disposed on the light guide plate, and a fixing element, passing through the first positioning portion and the second positioning portion such that the light guide plate is positioned in the frame.

The first positioning portion comprises a through hole, and the second positioning portion comprises a blind hole. The liquid crystal display comprises a metal frame, connected to the frame. The light guide plate abuts the frame, and the metal frame comprises a hole corresponding to the first positioning portion, disposed on the frame.

The fixing element comprises a pin and a threaded portion connected to the pin, and the pin is disposed in the second positioning portion. The first positioning portion comprises an internal thread corresponding to the threaded portion and engaged therewith.

The second positioning portion is located at a side of the light guide plate. The first positioning portion is located at a corner of the frame.

The backlight module further comprises a second positioning unit, corresponding to the first positioning unit, comprising a third positioning portion. The second positioning portion and the third positioning portion are disposed on opposite sides of the light guide plate. The second positioning portion and the third positioning portion are symmetrical.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
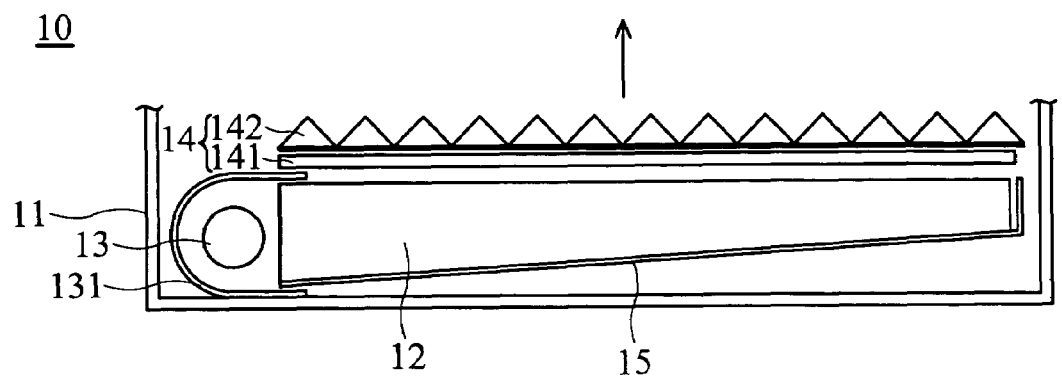
FIG. 1A is a local side view of a conventional backlight module.
Figure 1B:
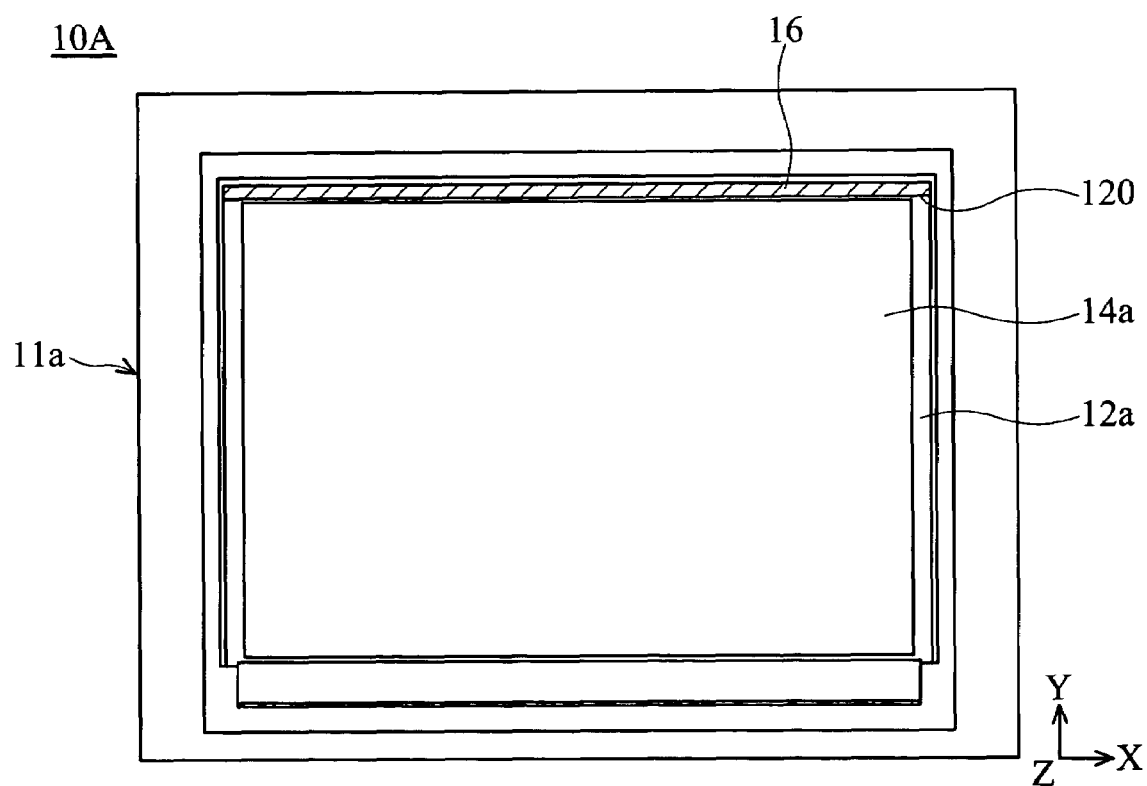
FIG. 1B is a top view of a conventional backlight module with a positioning structure for a light guide plate.
Figure 1C:
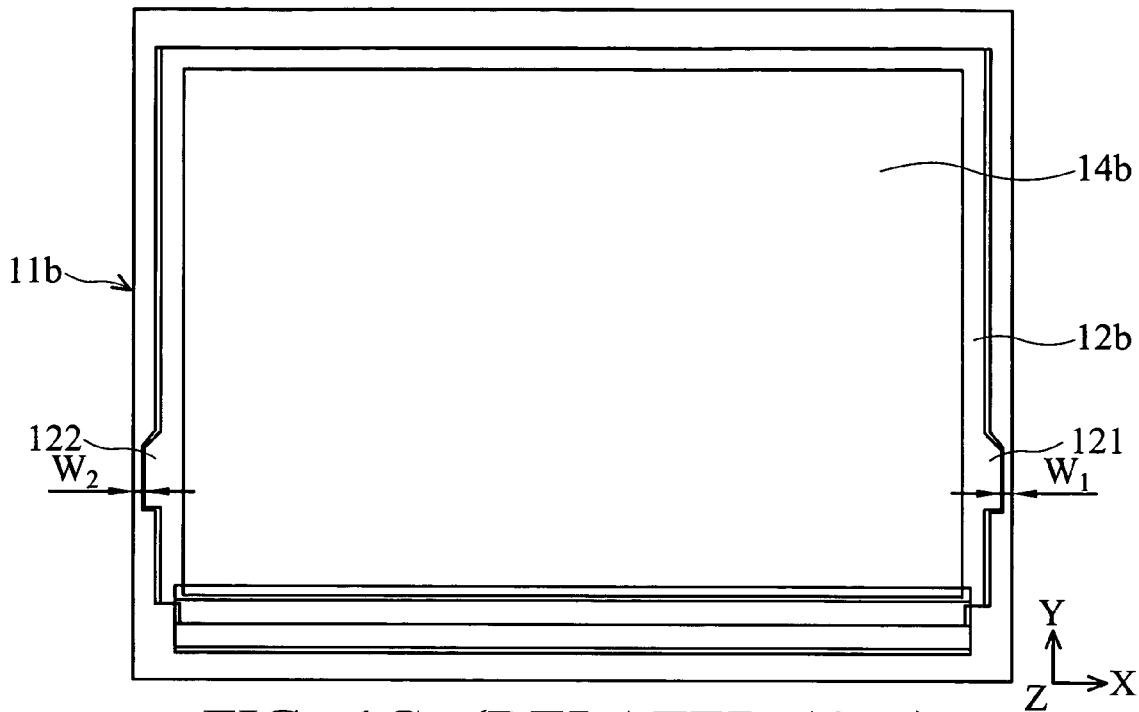
FIG. 1C is a schematic view of another conventional backlight module with a positioning structure for a light guide plate.
Figure 1D:
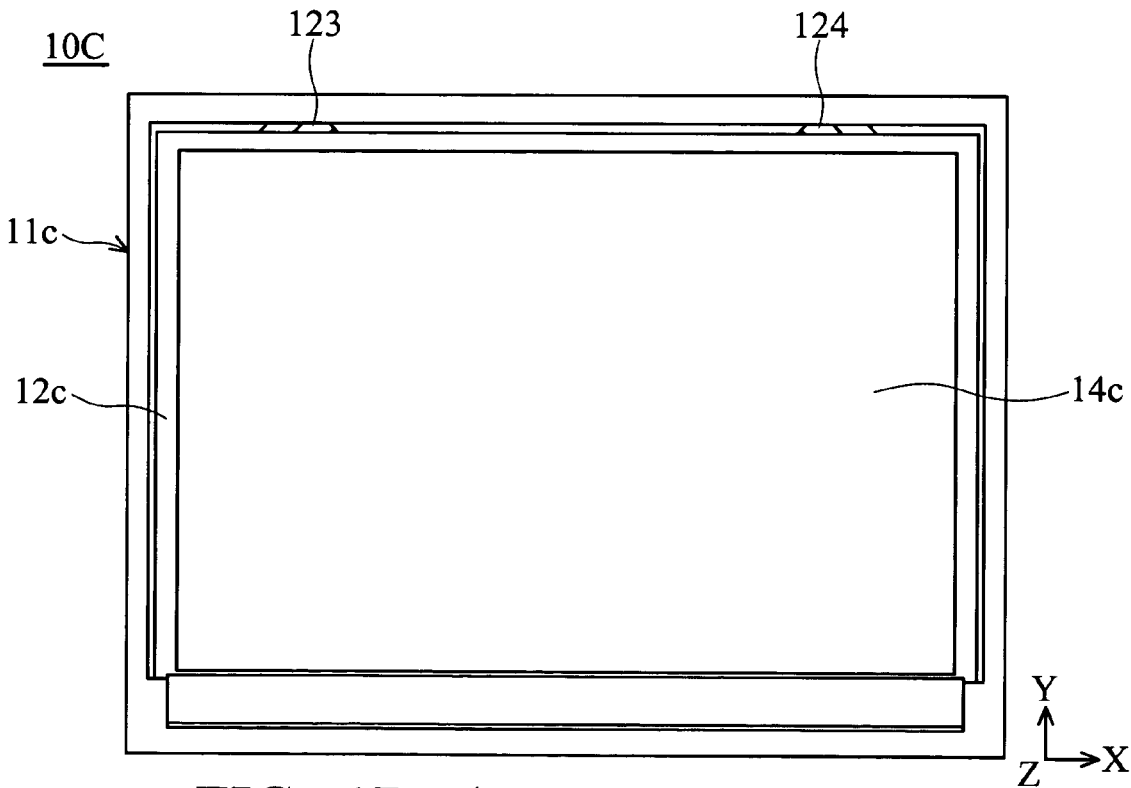
FIG. 1D is a schematic view of a conventional backlight module with a positioning structure for a light guide plate.
Figure 2A:
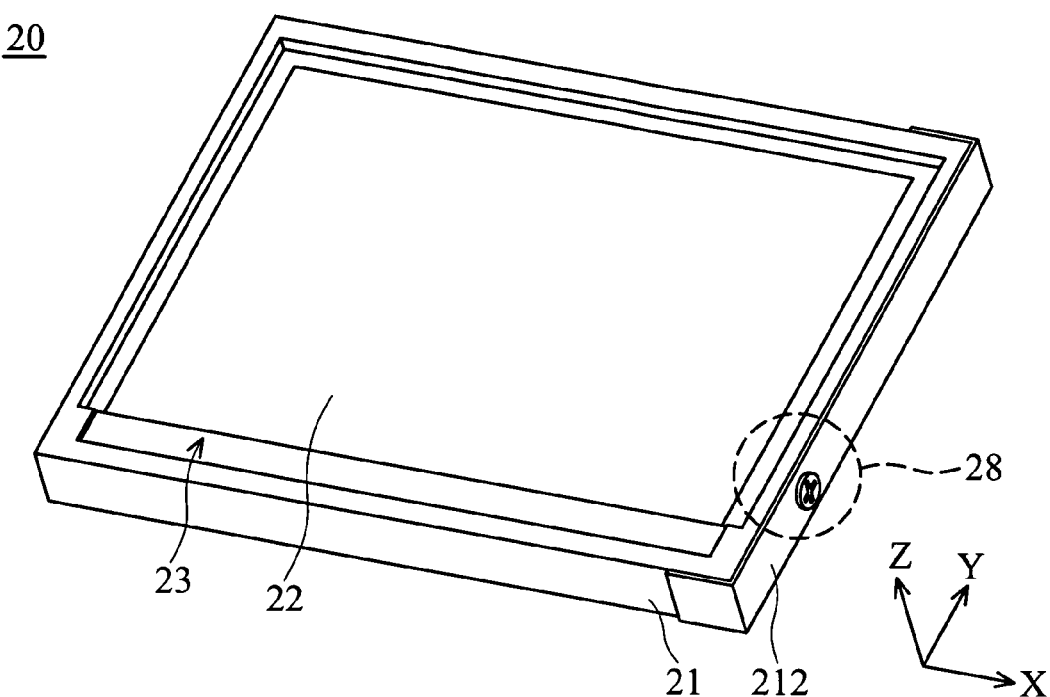
FIG. 2A is a perspective view of a backlight module of an embodiment of the invention.

FIG. 2A is a perspective view of a backlight module 20 of an embodiment of the invention.

In this embodiment, the backlight module 20, utilized in a liquid crystal display (LCD), comprises a frame 21, a light guide plate 22, a reflective plate 23, and a first positioning unit 28. The frame 21 can be plastic. The light guide plate 22 and the reflective plate 23 can be disposed in the frame 21 of the backlight module 20. Note that FIG. 2A shows no unrelated elements such as optical films, light source and others to more clearly illustrate the positioning structure of the light guide plate in the backlight module 20.

Figure 2B:
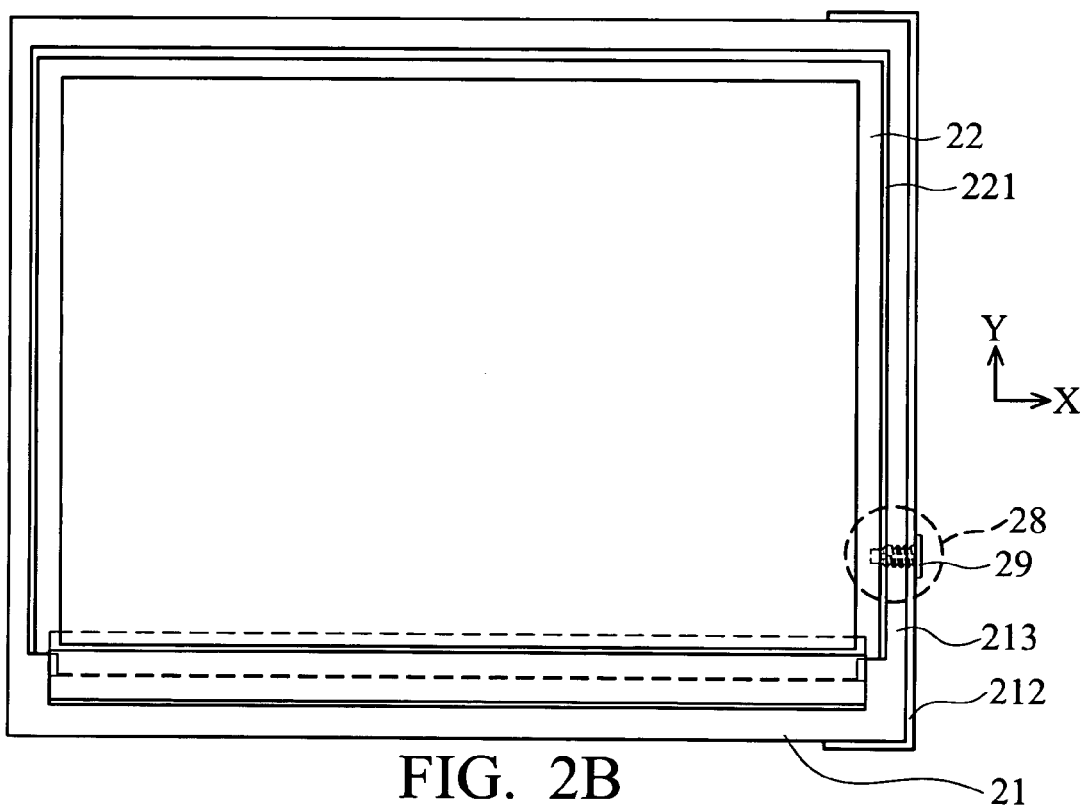
FIG. 2B is a front view of a backlight module of an embodiment of the invention.
Figure 2C:
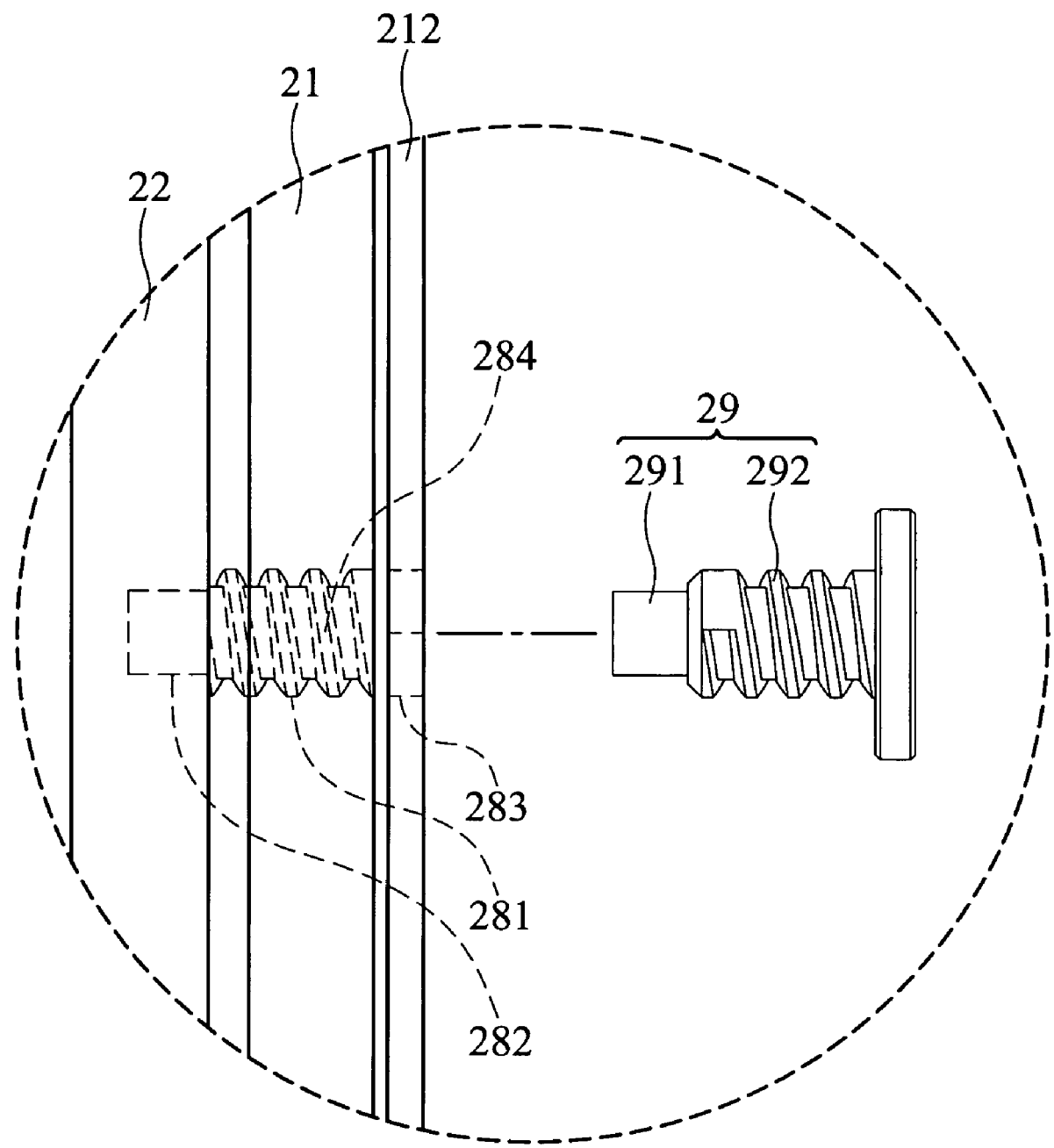
FIG. 2C is a local enlarged view of a first positioning unit of a dashed portion of FIG. 2B.

FIG. 2B is a front view of a backlight module 20 of an embodiment of the invention. FIG. 2C is a local enlarged view of a first positioning unit 28 of a dashed portion of FIG. 2B, in which a fixing element 29, a first positioning portion 281, and a second positioning portion 282 are separated.

As shown in FIGS. 2A, 2B, and 2C, the liquid crystal display further comprises a metal frame 212. The metal frame 212 connects the panel and the backlight module. The metal frame 212 comprises copper or other metals for increased structural strength. Note that no unrelated elements of the LCD are shown in the figures. The frame 21 of the backlight module 20 and the metal frame 212 of the LCD are connected. The light guide plate 22 abuts the frame 21. The first positioning unit 28 comprises a first positioning portion 281, a second positioning portion 282, and a fixing element 29. As shown in FIGS. 2B and 2C, the second positioning portion 282 is located at a side 221 of the light guide plate 22. The first positioning portion 281 is located at a corner 213 of the frame 21.

Furthermore, when the first positioning portion 281 is disposed on frame 21, the second positioning portion 282 is disposed corresponding to the first positioning portion 281 and on the light guide plate 22. In this embodiment, the first positioning portion 281 comprises a through hole, and the second positioning portion 282 comprises a blind hole. Additionally, the metal frame 212 comprises a hole 283 corresponding to the first positioning portion 281, disposed on the frame 21. The fixing element 29 passes through the hole 283, the first positioning portion 281 and the second positioning portion 282 such that the light guide plate 22 is positioned in the frame 21 and fixed along all axes X, Y, and Z.

Further in FIG. 2C, fixing element 29 comprises a pin 291 and a threaded portion 291 connected thereto, such that when fixing element 29 passes through the hole 283, the first positioning portion 281, and the second positioning portion 282, the threaded portion 292 is in the hole 283 and the first positioning portion 281, and the pin 291 is disposed in the second positioning portion 282.

In addition, the first positioning portion 281 comprises an internal thread 284 corresponding to the threaded portion 292 and engaged therewith. Note that, in practice, the fixing element 29 can be a self-tapping screw. That is, the first positioning portion 281 does not initially have a threaded portion, but one can be formed by self-tapping into the hole. Furthermore, another boss (not shown) can be embedded in the frame 21 to engage the threaded portion 292 of the fixing element 29.

Note that the embodiment of the invention modifies connection between a light guide plate and the frame, and thus, unrelated elements of the liquid crystal display are not further described. The positioning structure of the light guide plate can be applied in any type of liquid crystal displays.

Thus, the positioning unit of the invention constrains the light guide plate in all directions while accommodating thermal expansion and contraction. Upon rotation, the light guide plate maintains its original position without displacement, thereby preventing noise due to frictions between elements in the liquid crystal display.

Figure 3A:
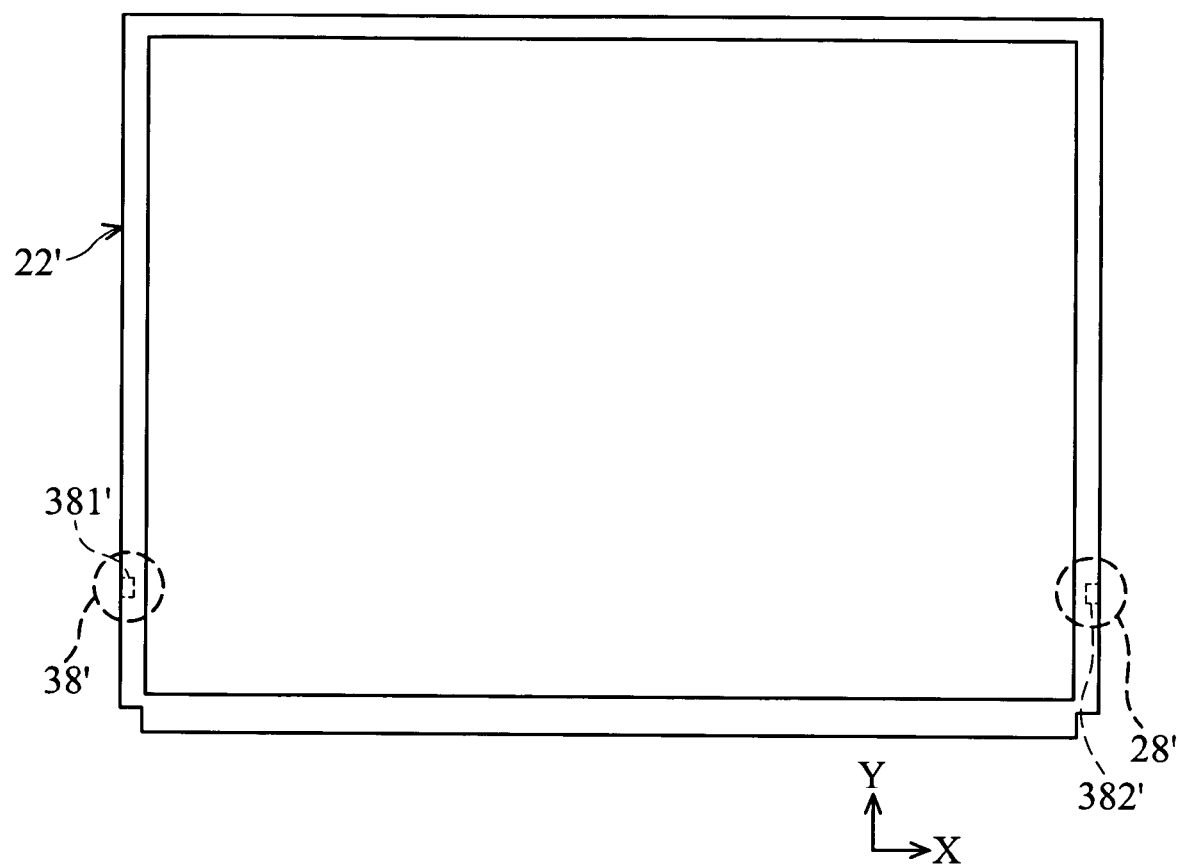
FIG. 3A is a front view of a variation of a backlight module of the invention, wherein only a light guide plate is shown.
Figure 3B:
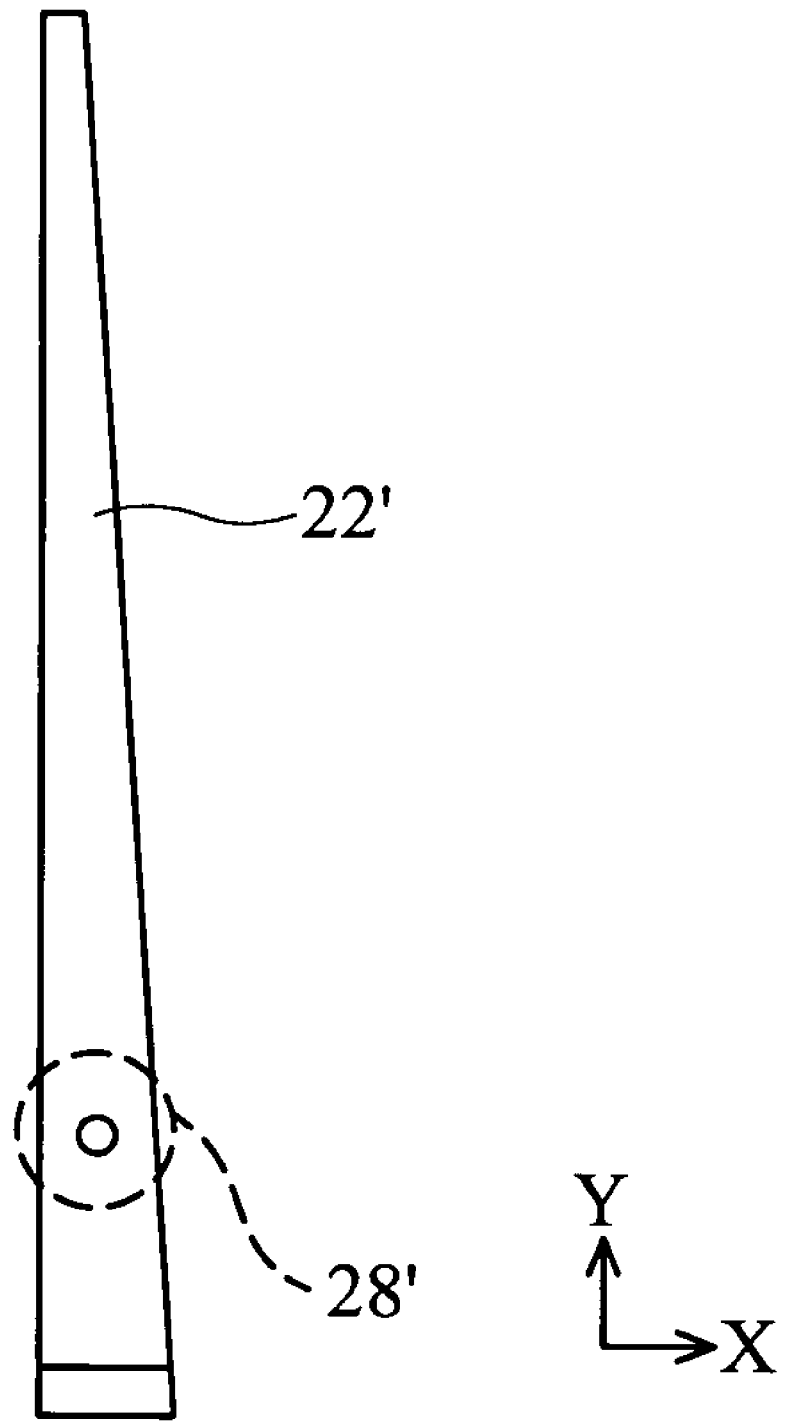
FIG. 3B is a side view of FIG. 3A.

The number of positioning units can vary with the size of the LCD or light guide plate. For example, FIGS. 3A and 3B are front and side views mainly showing a light guide plate 22', in which frame and other unrelated elements are not shown. The backlight module 20' comprises a first positioning unit 28' and a second positioning unit 38' corresponding thereto. The second positioning unit 38' comprises a third positioning portion 381', a fourth positioning portion (not shown) disposed on a frame (not shown), and a fixing element (similar to that of the previous embodiment). The second positioning portion 382' and the third positioning portion 381' are on opposite sides of the light guide plate 22', respectively. Note that although the second positioning unit is not fully shown in the figures, the structure of the second positioning unit is the same as the first positioning unit, and thus, no further description is provided.

In conclusion, the positioning unit can be symmetrically disposed on two opposing corners or sides of the light guide plate. Thus, when the LCD rotates, the problem of displacement of the light guide plate does not occur.

Moreover, the invention can position the light guide plate along Y axis, preventing light guide place displacement along the Y axis toward the thin portion of the frame, producing friction therewith. The light guide plate can be firmly positioned without changing shape or adding protrusions. Thus, the area of the light guide plate can be minimized. Consequently, the backlight module can have more space to increase thickness of the frame, thereby increasing structural support. Additionally, the light guide plate can be securely positioned in the Z axis without inserting a portion of the light guide plate into the frame, saving more materials of the light guide plate. Thus, the backlight module is securely assembled, preventing light guide plate displacement.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module for a liquid crystal display, comprising:
 a frame having a first positioning portion;
 a light guide plate, disposed in the frame, having a second positioning portion corresponding to the first positioning portion; and
 a first fixing element, comprising a non-threaded pin and a threaded portion, adapted to pass through the first positioning portion and the second positioning portion such that the light guide plate is secured in the frame, wherein the pin is disposed into the second positioning portion and the threaded portion is screwed into the first positioning portion.

2. The backlight module as claimed in claim 1, wherein the first positioning portion comprises a through hole, and the second positioning portion comprises a blind hole.

3. The backlight module as claimed in claim 1, further comprising a metal frame connected to the frame and forming a hole corresponding to the first positioning portion disposed on the frame.

4. The backlight module as claimed in claim 1, wherein the first positioning portion comprises an internal thread corresponding to the threaded portion.

5. The backlight module as claimed in claim 1, wherein the second positioning portion is formed at a side of the light guide plate.

6. The backlight module as claimed in claim 1, wherein the first positioning portion is formed at a corner of the frame.

7. The backlight module as claimed in claim 1, wherein the frame further has a third positioning portion, and the light guide plate further has a fourth positioning portion corresponding to the third positioning portion.

8. The backlight module as claimed in claim 7, further comprising a second fixing element adapted to pass through the third positioning portion and the fourth positioning portion.

9. The backlight module as claimed in claim 7, wherein the third positioning portion and the first positioning portion are symmetrical.

* * * * *